United States Patent
Bacchiani et al.

(10) Patent No.: US 7,996,224 B2
(45) Date of Patent: Aug. 9, 2011

(54) SYSTEM AND METHOD OF USING META-DATA IN SPEECH PROCESSING

(75) Inventors: Michiel A. U. Bacchiani, Summit, NJ (US); Sameer Raj Maskey, New York, NY (US); Brian E. Roark, Morristown, NJ (US); Richard William Sproat, Urbana, IL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1166 days.

(21) Appl. No.: 10/977,030

(22) Filed: Oct. 29, 2004

(65) Prior Publication Data
US 2005/0096908 A1 May 5, 2005

Related U.S. Application Data

(60) Provisional application No. 60/515,896, filed on Oct. 30, 2003.

(51) Int. Cl.
*G10L 15/04* (2006.01)
(52) U.S. Cl. .................................................. 704/254
(58) Field of Classification Search .................. 704/254
See application file for complete search history.

(56) References Cited

U.S. PATENT DOCUMENTS

| | | | | |
|---|---|---|---|---|
| 6,052,682 | A * | 4/2000 | Miller et al. | 707/3 |
| 6,212,672 | B1 * | 4/2001 | Keller et al. | 717/104 |
| 6,311,152 | B1 * | 10/2001 | Bai et al. | 704/9 |
| 7,120,582 | B1 * | 10/2006 | Young et al. | 704/255 |
| 7,124,080 | B2 * | 10/2006 | Chen et al. | 704/244 |
| 2003/0152261 | A1 * | 8/2003 | Hiroe et al. | 382/153 |
| 2003/0191639 | A1 | 10/2003 | Mazza | |
| 2003/0216905 | A1 * | 11/2003 | Chelba et al. | 704/9 |
| 2004/0111264 | A1 * | 6/2004 | Wang et al. | 704/257 |
| 2004/0243407 | A1 * | 12/2004 | Yu et al. | 704/240 |

FOREIGN PATENT DOCUMENTS
WO WO 99/14740 3/1999
WO WO 01/26092 A2 4/2001

OTHER PUBLICATIONS

Ye-Yi Wang, "A Unified Context-Free Grammar and N-Gram Model for Spoken Language Processing", 2000 IEEE International Conference on Acoustics, Speech,, and Signal Processing, vol. 3, Jun. 5, 2000-Jun. 9, 2000, pp. 1639-1642.

Maskey, et al. "Improved Name Recognition with Meta-Data Dependent Name Networks", Acoustics, Speech and Signal Processing, 2004 Proceedings, (ICASSP '04), IEEE International Conference on Montreal, Quebec, Canada, May 17-21, 2004, Piscataway, N.J. USA, IEEE, vol. 1, May 17, 2004, pp. 789-792.

\* cited by examiner

*Primary Examiner* — Jakieda R Jackson

(57) ABSTRACT

Systems and methods relate to generating a language model for use in, for example, a spoken dialog system or some other application. The method comprises building a class-based language model, generating at least one sequence network and replacing class labels in the class-based language model with the at least one sequence network. In this manner, placeholders or tokens associated with classes can be inserted into the models at training time and word/phone networks can be built based on meta-data information at test time. Finally, the placeholder token can be replaced with the word/phone networks at run time to improve recognition of difficult words such as proper names.

30 Claims, 2 Drawing Sheets

SYSTEM AND METHOD OF USING META-DATA IN SPEECH PROCESSING

PRIORITY CLAIM/RELATED APPLICATIONS

The present application claims priority to U.S. provisional Application No. 60/515,896 filed on Oct. 30, 2003, the contents of which are incorporated herein by reference. The present application is related to Ser. No. 10/976,378, filed on Oct. 29, 2004, the contents of which are incorporated herein by reference.

BACKGROUND OF THE INVENTION

1. Field of the Invention

The present invention relates to spoken dialog systems and more specifically to using meta-data for language models to improve speech processing by speech modules such as an automatic speech recognition module.

2. Introduction

Spoken dialog systems are becoming more prevalent in society. Technology is improving to enable users to have a good experience in speaking to a dialog system and receive useful information. The basic components of a typically spoken dialog system are shown in FIG. 1. A person 100 utters a word or a phrase that is received by the system and transmitted to an automatic speech recognition (ASR) module 102. This module converts the audible speech into text and transmits the text to a spoken language understanding (SLU) module 104. This module interprets the meaning of the speech. For example, if a person says "I want to find out the balance of my checking account," the SLU module 104 will identify that the user want his account_balance (checking). The output of the SLU module 104 is transmitted to a dialog manager (106) that determines what response to provide. The response is transmitted to a spoken language generation module (LG) 108 that generates text for the response. For example, in the above example, the response may be "OK, thank you. Your checking account balance is one hundred dollars." The text of the response is then transmitted to a text-to-speech module (110) that converts the text into audible speech which the user then hears to complete the cycle.

One of the challenges of spoken dialog systems is dealing with names. A transcription system that requires accurate general name recognition and transcription may be faced with covering a large number of names that it will encounter. When developing a spoken dialog system, language models are trained using expected words and phrases to help the system interact with the user according to an expected "domain." For example, a spoken dialog system for a bank will have a set of expectations regarding user requests. Having a known domain helps designers prepare the spoken dialog system to achieve a recognition accuracy that is acceptable. In a banking domain, words and phrases such as "account balance", "checking", "savings", "transfer funds" are expected and may be part of a finite grouping.

However, without prior knowledge of the names of people, a spoken dialog system will require a large increase in the size and complexity of the system due to the expansion of the lexicon. Furthermore, this increase will adversely affect the system performance due to the increased possibility of confusion when trying to recognize different names. One example of a system that must have accurate name transcription by its ASR module is a directory assistance and name dialer system. Building such a system is complex due to the very large number of different names it may encounter. An additional complicating factor is the pronunciation of names which can vary significantly among speakers. As a result, ASR research on name recognition has received a fair amount of attention. The feasibility of a directory assistance application with as many as 1.5 million names has been investigated and it has been shown that recognition accuracy drops approximately logarithmically with increasing vocabulary size. A significant degradation in performance with increasing lexicon size has also been shown. Larger lexicons that allow more diverse pronunciations can be beneficial. Most efforts have focused on soliciting more detailed speech input from the user in the form of spelling, and have shown that this improves the system performance. Neural networks have also been shown to focus the search on the most discriminative segments in a multi-pass approach. One attempt has shown improvement in name recognition accuracy by incorporating confidence scores into the decision process.

Common among all previous work is that the coverage issue was addressed by increasing the vocabulary size. The increased confusability introduced by that increase is then addressed by more complex search and acoustic modeling, which is more costly. Therefore, what is needed in the art is an improved system and method for recognizing names or other similarly situated words or phrases in a spoken dialog. The improved system and method should be less costly and time consuming.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Something that has not been taken into account in the modeling approaches discussed above is the prior probability distribution across names. Indeed, if no additional information is available, a uniform (or context independent frequency weighted) distribution across names is a reasonable estimate. However, in most contexts, a very small subset of the possible names will account for most of the true probability mass. In other words, the distribution of names seen in the speech of a particular speaker is very unlikely to be distributed uniformly across the large list of possible names. If the subset of names that are most likely to occur in a given context are known, the system accuracy can be increased with a decrease in complexity.

One embodiment of the invention is a method of generating a language model. Such a model may be used in an automatic speech recognition module or may be used in one of the modules within a spoken dialog system. The method comprises building a class-based language model, generating at least one sequence network and replacing class labels in the class-based language model with the at least one sequence network. In this manner, placeholders or tokens associated with classes can be inserted into the models at training time and word/phone networks can be built based on meta-data information at test time. Finally, the placeholder token can be replaced with the word/phone networks at run time to improve recognition of difficult words such as proper names.

Other embodiments of the invention include at least (1) an automatic speech recognition module using a language model generated according to the principles set forth herein, (2) a system such as a spoken dialog system or another type of computing device that may utilize at least one language processing module (e.g., ASR, LG, TTS, etc.) that requires a language model generated according to the principles set forth herein, and (3) a computer-readable medium that stores instructions for controlling a computing device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
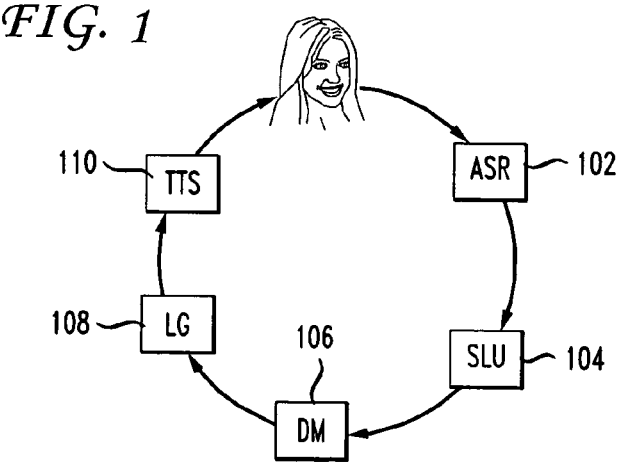
FIG. 1 illustrates a basic prior art spoken dialog system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Disclosed will be a system, method and computer-readable media for improving the performance of a language-related module that may be used in a spoken dialog system or some other application. A preferable use of the invention is to improve the ASR module's recognition accuracy for words such as names. The main aspects of the invention will be discussed with reference to the ASR module of a spoken dialog system. However, the basic principles of the invention are applicable to any component or module within a spoken dialog system. Furthermore, a language module (such as an ASR module) or language-processing function may also be used in any kind of computing device independent of a full spoken dialog system. For example, some kind of home appliance or vehicle feature may include an ASR module that receives an utterance from a user and takes an action, such as calling a particular person or turning on the television.

For many speech applications, information in addition to the speech that is to be recognized is available. For example, a voicemail has a mailbox, with an associated user name. A caller usually has an associated caller ID string. This additional information will be referred to as meta-data. The basic concept of the present invention is to build language models such as the speech recognition model, to include the relevant meta-data, and hence can recognize names when a name is spoken, or other words that are difficult to recognize. This can provide a tremendous benefit. One costly way to do this is to build new models for every message. However, the method proposed below provides a more economical approach to recognizing names or other difficult words. It is noted that most of the examples provided herein will relate to recognizing names. However, the principles are not limited to names. Other examples of how this invention may apply include such areas as news or technology. For example, if meta-data includes a word such as "Internet" then the method may be applied to identify other words that mean the same ("Worldwide-web", "the 'Net", "the blogosphere" and so forth) such that the speech processing module, when the invention is applied to such words, may be able to utilize an improved language model.

As an introduction to this invention, it relates to a rapid construction of sub-networks based on given information external to a speech signal for inclusion in large previously constructed networks. Information external to the speech signal (referred to herein as meta-data) may be any information such as a name received from caller-ID or an e-mail address or URL associated with a voice over IP communication. The information external to the speech signal can be quickly integrated with the language models to improve recognition accuracy. Certain kinds of terms such as proper names are a problem for speech recognition because they often fall out of vocabulary. If the vocabulary is extended to include many, many names, the complexity of the system increases to a problematic level. Therefore, the present invention shows how external information can alleviate this issue by using side information has not been previously investigated in the language modeling community.

The method embodiment of the invention uses meta-data available at runtime to ensure better name coverage without significantly increasing the system complexity. The approach has been tested on a voicemail transcription task and assumed meta-data to be available in the form of a caller ID string (as it would show up on a caller ID enabled phone) and the name of the mailbox owner. Networks representing possible spoken realization of those names are generated at runtime and included in network of the decoder. The decoder network is built preferably at training time using a class-dependent language model, with caller and mailbox name instances modeled as class tokens. While the use of names as class tokens is preferable, class tokens may also relate to classes of information different from a person or company's name. The class tokens are replaced at test time with the name networks built from the meta-data. This method showed via testing a reduction in the error rate of name tokens of 22.1%.

The present inventors have focused on name recognition in a voicemail transcription task and assume context information or meta-data is available in the form of the name of the mailbox owner and the caller ID string from the incoming call leaving the voicemail message. Caller identification information is typically provided by phone companies. In a Voice Over IP context, name, email address, or other types of meta-data information may also be available. For example, an agenda for a business meeting, flyers, websites, and so forth may provide identifiable data such as company name or names of people attending the meeting.

There is a natural class of names of people or names of companies that tend to occur similarly in a speech signal. In a voicemail database, an example may be, "Hey, Jon, I am just calling to say hello." The caller ID for this call may provide further information: Jonathan Smith. In this way, a name-class can be defined in the language that is being produced. Since these proper names occur or are announced in similar ways and in similar contexts. One can take the specific instance that is being modeled and insert it into a grammar that improves the language model to recognize that particular proper name.

One aspect of the invention involves receiving the text of a proper name (or other type of meta-data) and identifying its orthographic representation and mapping it to phonological realizations of the name. For example, taking the name John Smith, likely nicknames and variations include Johnny, Jonathan, Mr. Smith, and so forth. Therefore, the issue of how to map from orthographic realization provided to something to be included in an ASR transducer or other spoken dialog system module is described herein. As noted above, another aspect of the invention is outside the use of names but to other words that may also have companion words or other phonological representations of the word.

A voicemail database used in experiments for the present invention is described next, followed by a description of how the meta-data is used to condition the spoken dialog system. Experimental results obtained using the invention then are presented with a discussion of the results.

Transcription experiments were conducted on a 100 hour corpus of voicemail messages collected from the voicemail boxes of 140 people. This corpus, named ScanMail, contains approximately 10,000 messages from approximately 2500 speakers. The corpus is approximately gender balanced and approximately 12% of the messages are from non-native speakers (as assessed by the labeler from listening to the speech). The mean duration of the messages is 36.4 seconds, the median is 30.0 seconds. The messages were manually transcribed and those parts of the transcripts that identify the caller and mailbox owner were bracketed. The identifications usually occur in the beginning of the message such as:

hi [Greeting: mister jones] this is [CallerID: john smith] calling . . . .

A two hour test set was chosen by randomly selecting 238 messages from the corpus. The remaining speech was used as the training set to build the acoustic and language models. In this test set, there were 317 word tokens corresponding to caller names and 219 word tokens corresponding to mailbox owner names.

The approach to including the name meta-data into the spoken dialog system (such as for the ASR module) uses a class-based language model, built preferably at training time. This language model represents name occurrences by class tokens. Then, preferably at test time, the name meta-data is used to produce a name network that gives possible, probability weighted spoken realizations of the meta-data defined names. That name network is then included in the recognition network by a network replacement step.

Figure 4:
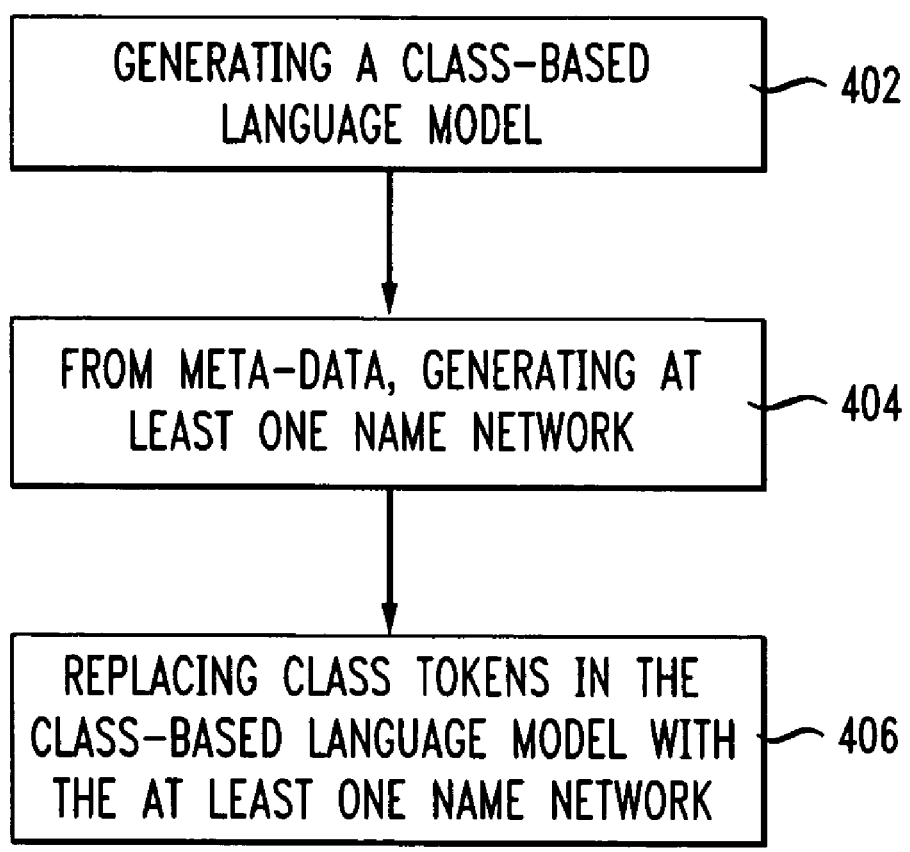
FIG. 4 illustrates an example method embodiment of the invention.

The method aspect of the invention is shown by way of illustration in FIG. 4. The process of constructing class-based language models is known to those of skill in the art. See, e.g., Cyril Allauzen, Mehryar Mohri, and Brian Roark, "Generalized algorithms for constructing language models," in *Proceedings of the 41st Annual Meeting of the Association for Computational Linguistics,* 2003, pp. 40-47, incorporated herein by reference. Sequences of tokens in the training corpus that were annotated as the mailbox name or the caller name were replaced with the class labels (mname) and (cname), respectively. From this corpus, with class labels treated as words, a model was built (such as a standard Katz backoff trigram model) and encoded as a weighted finite-state automaton. To make the model usable, transitions labeled with class labels must then be replaced by the sequences of words that are members of that class. In this regard, a class-based language model is generated (402). Another way to state this step is that it involves inserting a placeholder into the models preferably at training time.

Next, a name network is generated (404). This involves building a word/phone network based on the given information preferably at testing time. For each voicemail message in the test set, the name of the mailbox owner was provided, and the name of the caller, if it was available, which it was for 71 percent of the test messages. For each provided name, e.g. Jeremy Jones, there are a variety of ways in which the name could be realized, e.g. Jerry Jones, Mister Jones, Jeremy, etc. This variation is the result of two random processes: first, the sequence of title, first name and last name can vary; next there can be many possible forms of the first name. From the training corpus, the probability of different realizations of the sequence of title was estimated, for each name class, first name (regardless of form) and last name.

Figure 2:
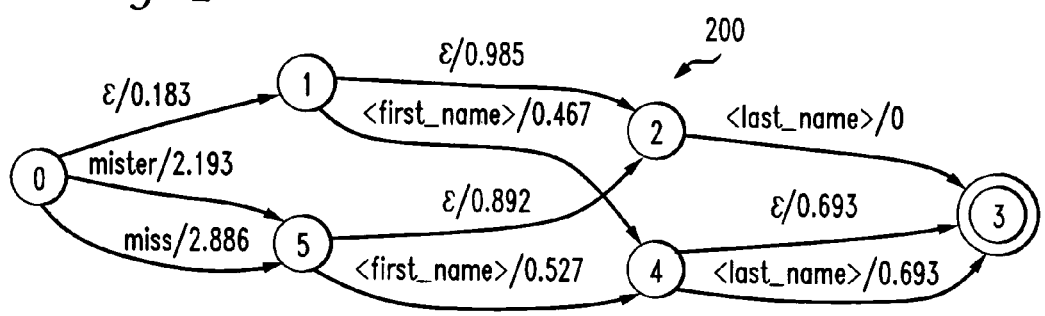
FIG. 2 illustrates an example name sequence network.
Figure 3:
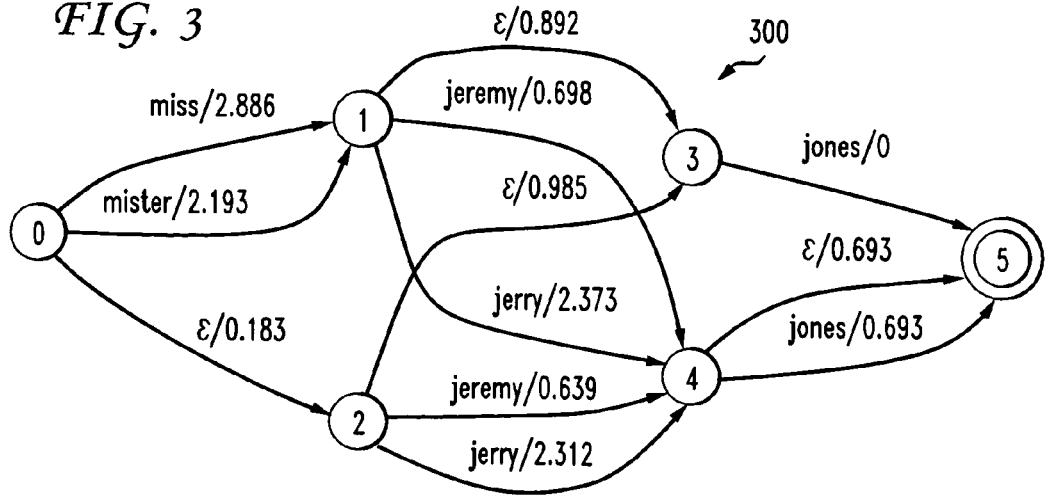
FIG. 3 illustrates a name network for the name "Jeremy Jones"

FIG. 2 shows a weighted acceptor (name sequence network) 200 with first name and last name labels, which represents a distribution over possible name sequences, weighted by negative log probabilities. FIG. 3 illustrates an example name network for the name Jeremy Jones.

For the probabilities of forms of first names, the inventors use a directory listing having the full name and optional nicknames for 40,000 people. For a given first name, the inventors counted each nickname for people with that name, and used the maximum likelihood estimate based on these counts for the nickname given the name. If no nickname was listed, it was counted as though the full form of the name was the nickname. In order to always allow for the full form of the name, if every observation with the name has a nickname, the full form can be given one count. For a particular caller ID, the <first.name> and <last.name> tokens in the graph in FIG. 2 must be replaced by the actual last name and a distribution over possible first name forms—i.e. nicknames or the full form—for the specific caller. FIG. 3 shows such a weighted name sequence acceptor when the caller name is Jeremy Jones.

With reference again to FIG. 4, the occurrences of the (cname) token in the language model must then be replaced by this network (406), with their weights combined. This can be done with composition of finite-state transducers. See, e.g., Allauzen, Mohri and Roark, incorporated above.

The ScanMail voicemail system uses an optimized recognition network, which combines the pronunciation lexicon L and the grammar G into a single optimized finite-state transducer through off-line composition, determinization and minimization. As used herein, the terms grammar and language model or class-based language model typically mean the same thing. This network composition and optimization can be quite costly in space and time and is generally done once and the result treated as a static model.

In the current scenario, this resource cannot be static, since each message can have a different mailbox and caller ID. Composing and optimizing the entire network for each message is impractical. To avoid this, each name class label is provided with a special phone symbol in the lexicon, which allows the system to produce an optimized L∘G for the class-based G. For each message, L∘G is produced by composing the name network G' with the lexicon and optimizing. Every transition in the original class-based L∘G with a name class label (i.e. (mname) or (cname)) as the output label (and hence the special phone symbol as the L∘G input label) is then replaced with the L∘G' for that name class, and the weights are combined appropriately. The overhead of producing the very small L∘G' and replacement in the large L∘G is relatively low.

The algorithm was evaluated on the 238 message ScanMail test set. This test set was drawn from the ScanMail corpus by random selection of messages. This means that for most test messages, there will be messages in the training set that were received in the same mailbox. The number of training messages received at a particular mailbox varied from 1 to 11 with an average of 3 messages per mailbox. The overlap in mailbox recipients results in an experimental setup that is likely to provide a lower error rate, especially on names, than a scenario where the test data is from mailboxes never seen in the training data. To normalize for this effect, the experiment used a different language model for each test message. The language models were constructed by excluding training messages from the same mailbox as the test message.

For the 238 test messages, the (mname) meta-data value was known for all messages but the (cname) meta-data was available for only 169 messages. For the messages that did not have the (cname) meta-data available, the inventors used a system that only used the (mname) class.

To evaluate the performance of the algorithm, in addition to Word Error Rates (WER) the inventors measured the error rate on the name tokens corresponding to the (mname) and (cname) class tokens. Using the alignments produced in computing the WER, the Name Error Rate (NER) is computed as the percentage of name tokens that were labeled as an error (either a deletion or a substitution) in that alignment.

The baseline system using no name replacements had a WER of 26.6% (7233 tokens). Using the proposed algorithm replacing only (mname) tokens, the WER dropped to 26.3% (7147 tokens). When replacing both (mname) and (cname) tokens, the WER rate dropped to 26.0% (7066 tokens).

TABLE 1

WER and NER

| System | Word Error Rate | Name Error Rate |
| --- | --- | --- |
| Baseline | 26.6% | 56.9% |
| (mname) | 26.3% | 45.7% |
| (mname) + (cname) | 26.0% | 34.8% |

The performance of the algorithm is summarized in Table 1. Among the 219 name tokens corresponding to (mname) class tokens, there were 128 errors in the baseline transcripts. Using the system that did (mname) replacements, this dropped to 68 errors. Among the 317 (cname) tokens, 177 were misrecognized in the baseline recognizer output. Using the (mname) and (cname) replacement system this error rate dropped to 119 errors. The total number of misrecognized name tokens in the baseline was 305 corresponding to a 56.9% NER. Using the (mname) and (cname) replacement system, the name token error rate dropped to 187 or 34.8% NER. This is an absolute NER reduction of 22.1%.

The word error rate improvement of the of the (mname) replacement system in terms of the number of tokens was 86 which is higher than the number of corrections among (mname) tokens (60) showing that the replacement had a small beneficial effect on the words surrounding the name tokens. Similarly, for the (mname) and (cname) replacement system, the number of corrected tokens in the WER computation exceeds the number of corrected (mname) and (cname) tokens by 49 showing the same small beneficial effect.

Out of the 536 name tokens corresponding to the (mname) and (cname) class tokens, 35 were out of vocabulary (OOV) word tokens. The (mname) and (cname) replacement system correctly recognized 24 (69%) of those.

The runtime overhead was computed on a 30 message, randomly selected from the test set. The average real time factor processing the messages with the baseline system was 3.8. The runtime of the (mname) replacement experiment increased this factor to 4.3 (a 13% increase). For the (mname) and (cname) replacement experiment, the average real-time factor was 4.6, a 20% increase compared to the baseline.

Although the decrease in overall WER was not large, names are of particular importance, so that the large reduction in name error rate is critical to both the perception and use of the system. ScanMail users have expressed a strong desire for the system to recognize these tokens correctly.

The results show that the proposed algorithm is not only useful for addressing errors that arise from OOV tokens but also improves on in-vocabulary name recognition. Where in a static system, the distribution across names may be fairly flat, the meta-data dependent system effectively provides a relatively peaked distribution for those names that correspond to allowed realizations of the given names.

Unlike previous efforts, the use of meta-data allows for the design of a system with good name coverage without a significant increase in system complexity. Although, unlike other systems, the use of meta-data incurs a run-time overhead at test time, this overhead is possibly smaller than the additional overhead incurred by a significant increase in complexity.

In contrast to systems with a static name inventory, the proposed algorithm avoids the need for manual system design when it is moved to new environment. Where a static system will likely incur an increase in the OOV rate, the proposed algorithm automatically adapts due to the run-time network generation.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention may be used as a method for building language models or a spoken dialog system using language models built according to the steps set forth above. A language model built according to this method may be used in any module such as an ASR module in any type of application besides a full spoken dialog system as well. Further, using methods described above, new models could be built from scratch for each utterance. Accordingly, the appended claims and their legal equivalents should only define the invention, rather than any specific examples given.

We claim:

1. A method for generating a language model, the method comprising:
building a class-based language model;
generating, via a processor, at run time at least one sequence network based on side information that is different from any data used to build the class-based language model; and
replacing class labels in the class-based language model with the at least one sequence network, wherein the at least one sequence network comprises members of a class for each class label, the members of the class identified by the side information.

2. The method of claim 1, wherein building the class-based language model further comprises replacing sequences of tokens from a training corpus for the class-based language model with the class labels.

3. The method of claim 2, wherein the class labels relate to at least one of a mailbox name and a caller name.

4. The method of claim 2, wherein the class labels are treated as words and building the class-based language model further comprises:
building a trigram model; and
encoding the trigram model as a weighted finite-state automaton.

5. The method of claim 4, wherein transitions in the weighted finite-state automaton are replaced by sequences of words that are members of a class associated with the class labels.

6. The method of claim 1, wherein generating at least one sequence network further comprises:
estimating for each class of the class-based language model a probability of different realizations of words in each class; and
replacing a first weighted sequence network with the different realizations of words in each class to generate a second weighted sequence network.

7. The method of claim 6, wherein the different realization of the words associated with the first weighted sequence network and the second weighted sequence network are names.

8. The method of claim 1, wherein the sequence network is a name sequence network.

9. The method of claim 1, wherein replacing class labels in the class-based language model with the at least one sequence network further comprises combining the weights of the at least one sequence network.

10. The method of claim 9, wherein combining the weights of the at least one sequence network is performed with a composition of finite-state transducers.

11. The method of claim 1, wherein each class label is a name class label that has a special phone symbol in a lexicon.

12. The method of claim 11, wherein replacing class labels in the class-based language model with the at least one sequence network further comprises:
combining the class-based language model with the lexicon;
optimizing the combined class-based language model and lexicon; and
replacing each transition in the class-based language model having a name class label as the output label with the optimized, combined class-based language model and lexicon for that name class.

13. The method of claim 12, further comprising combining weights in the replacement of each transition.

14. The method of claim 1, wherein building a class-based language model is performed at training time, generating at least one sequence network is performed at test time and replacing class labels in the class-based language model with the at least one sequence network is performed at run-time.

15. A speech recognition system, the speech recognition system comprising:
a first module configured to control a processor to build a class-based language model;
a second module configured to control the processor to generate at run time at least one sequence network based on side information that is different from any data used to build the class-based language model; and
a third module configured to control the processor to replace class labels in the class-based language model with the at least one sequence network, wherein the at least one sequence network comprises members of a class for each class label, the members of the class identified by the side information.

16. The speech recognition system of claim 15, wherein the first module further replaces sequences of tokens from a training corpus for the class-based language model with the class labels.

17. The speech recognition system of claim 16, wherein the class labels are treated as words and the first module further:
builds a trigram model; and
encodes the trigram model as a weighted finite-state automaton.

18. The speech recognition system of claim 17, wherein transitions in the weighted finite-state automaton are replaced by sequences of words that are members of a class associated with the class labels.

19. The speech recognition system of claim 15, wherein the sequence network is a name sequence network.

20. The speech recognition system of claim 15, wherein the third module further combines the weights of the at least one sequence network.

21. The speech recognition system of claim 15, wherein the first module builds the class-based language model at training time, the second module generates the at least one sequence network at test time and the first module replaces class labels in the class-based language model with the at least one sequence network at run-time.

22. A non-transitory computer-readable medium that stores instructions for controlling a computing device to generate a language model, the instructions comprising the steps:
building a class-based language model;

generating at run time at least one sequence network based on side information that is different from any data used to build the class-based language model; and replacing class labels in the class-based language model with the at least one sequence network, wherein the at least one sequence network comprises members of a class for each class label, the members of the class identified by the side information.

23. The non-transitory computer-readable medium of claim 22, wherein building the class-based language model further comprises replacing sequences of tokens from a training corpus for the class-based language model with the class labels.

24. The non-transitory computer-readable medium of claim 23, wherein the class labels are treated as words and building the class-based language model further comprises:
    building a trigram model; and
    encoding the trigram model as a weighted finite-state automaton.

25. The non-transitory computer-readable medium of claim 24, wherein transitions in the weighted finite-state automaton are replaced by sequences of words that are members of a class associated with the class labels.

26. The non-transitory computer-readable medium of claim 22, wherein the class labels relate to at least one of a mailbox name and a caller name.

27. The non-transitory computer-readable medium of claim 22, wherein generating at least one sequence network further comprises:
    estimating for each class of the class-based language model a probability of different realizations of words in each class; and
    replacing a first weighted sequence network with the different realizations of words in each class to generate a second weighted sequence network.

28. The non-transitory computer-readable medium of claim 27, wherein the different realization of the words associated with the first weighted sequence network and the second weighted sequence network are names.

29. The non-transitory computer-readable medium of claim 22, wherein the sequence network is a name sequence network.

30. The non-transitory computer-readable medium of claim 22, wherein building a class-based language model is performed at training time, generating at least one sequence network is performed at test time and replacing class labels in the class-based language model with the at least one sequence network is performed at run-time.

* * * * *